J. PEYER.
TOOL FOR ALINING AND FITTING MACHINE PARTS.
APPLICATION FILED NOV. 29, 1918.
1,352,311. Patented Sept. 7, 1920.
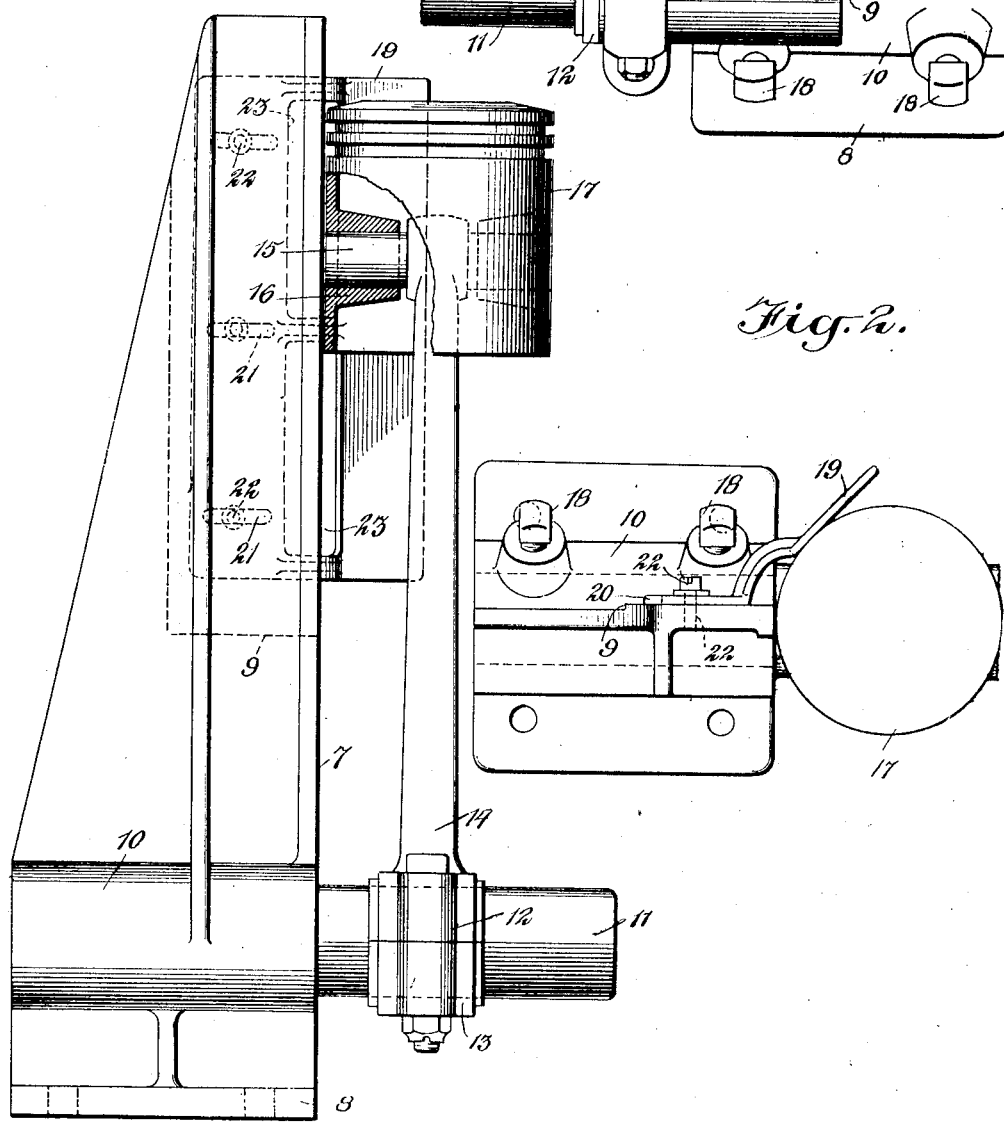
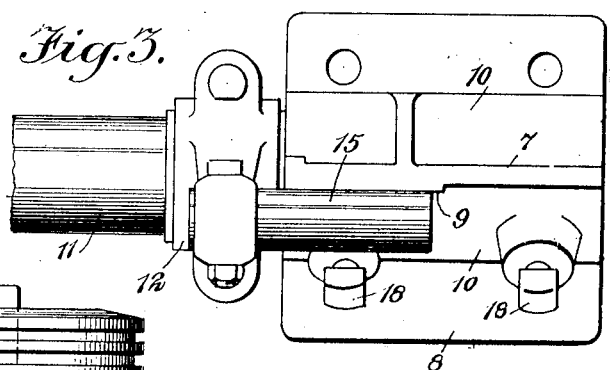
WITNESSES
INVENTOR
John Peyer
BY
ATTORNEYS

UNITED STATES PATENT OFFICE.

JOHN PEYER, OF NEW YORK, N. Y.

TOOL FOR ALINING AND FITTING MACHINE PARTS.

1,352,311.  Specification of Letters Patent.  Patented Sept. 7, 1920.

Application filed November 29, 1918. Serial No. 264,670.

*To all whom it may concern:*

Be it known that I, JOHN PEYER, a citizen of the United States, and a resident of the city of New York, borough of Brooklyn, in the county of Kings and State of New York, have invented a new and improved Tool for Alining and Fitting Machine Parts, of which the following is a full, clear, and exact description.

Among the principal objects which the present invention has in view are: to perform the operations for which the tool is designed under conditions more adapted to promote favorable results; to remove the necessity for performing the required work under cramped or inverted positions; to insure greater accuracy in the work performed; and to correlate the various operations incident to alining and fitting machine parts.

A broad purpose of the invention is to provide the design of a connecting rod and piston jig or tool to be used for fitting and re-alining the wrist pin bearings and connecting rod bearings in automobile engines.

Drawings.

Figure 1 is a side view of a tool of the character mentioned constructed and arranged in accordance with the present invention, and showing in coöperative relation thereto an engine piston, connecting rod and bearing box therefor;

Fig. 2 is a top plan view of the same;

Fig. 3 is a similar view showing the parts arranged as when testing a connecting rod for torsional deflection.

Description.

As seen in the drawings, the tool provides a standard 7, the vertical face of which is machine trued. The standard has a base 8 and a bolting pad 9. The surface of the base 8 is machine trued to a plane perpendicular to the trued edge or face of the standard 7. The standard 7 has a boss 10, which is bored to receive a close fitting shaft 11, which is held in position by bolts 18. The bore in the boss 10 is perpendicular to the trued edge of the standard and is parallel to the machined surface of the base 8. The surface of the pad 9 is likewise machined to provide a surface parallel with the axis of the bore in the boss 10. The bearing box 12 on a connecting rod, such as indicated in the drawings by the numeral 14, is usually integral with the said rod. The cap 13 is separably related to the box 12 as commonly in practice in engine construction. The soft bearing in the said box and cap is usually fitted to the crank pin of the crank shaft, the said shaft being usually installed in the engine.

In the process of fitting the bearing to the crank pin, the mechanic is compelled to stoop over or lie under the engine and to remove the cap from the box 12 to lift said box and cap from the said crank pin for inspecting the bearing to find the rubbing areas thereof. After these areas have been reduced by scraping, the box and cap are placed in position on the crank pin and the operation repeated, until the rubbing surface is uniform. The mechanic during this operation is compelled to assume an uncomfortable position and the work is necessarily delayed by the need for installing and removing the cap incident to each inspection.

The above objections are avoided when using the herein described tool. The crank shaft bearing of the connecting rod is slipped off the trial shaft or arbor 11 and is inspected in its entirety. The trial shaft or arbor 11 has the same diameter as a crank shaft upon which the connecting rod is to be mounted in an engine. The rubbed areas are then scraped and the bearing slipped over the shaft 11. The cap is slightly tightened on the shaft and the connecting rod rocked to cause the high spots in the bearing to rub. This operation may be repeated many times until the bearing is trued, without removing the cap 13.

During the operation described, provision is made for alining the bearing, the connecting rod 14 being held in parallel relation to the trued surface of the standard 7. It is obvious that if the connecting rod 14 is straight and is not twisted, the bearing fitted to the shaft 11 must be accurately perpendicular to the plane of oscillation of the connecting rod in service. To secure these conditions, the connecting rod is first trued to the vertical machined edge of the standard 7 and to the trued surface of the trial face 9.

To perform the first operation, the connecting rod is mounted in the piston 17 and in the bearings 16 thereof by means of the wrist pin 15. The piston 17 and connecting rod are then moved until the side of the piston engages the vertical edge of the standard 7.

To assist in this operation, a steady rest 19 is mounted on the standard 7. The steady rest 19 has a base plate 20, wherein elongated slots 21 are formed. Clamping bolts 22 extend through the slots 21 and engage tapped bores in the standard 7 and in the trial face 9 thereof. The bolts 22 fit the slots 21 and form guides for moving the steady rest to govern the service position thereof, whereby said rest may accommodate pistons of different sizes when shifted forward or back from the edge of the standard 7.

The steady rest 19 has a trued surface, which in service is disposed at an angle to the axis of the bore in the boss 10. This permits the use of the rest 19 for governing the space separating the side of the piston and the edge of the standard 7.

Pistons of the character shown are trued to a small fraction of an inch, usually to within .002 of an inch. This variation is so slight that the best method of ascertaining any inaccuracy is to provide an air gap or space between the trued surface of the standard 7 and the surface of the piston 17. For this purpose, the rest 19 is provided with openings 23, which in the various positions of the rest are disposed opposite or in line with the trued edge of the standard 7.

In practice, the piston 17 is disposed in close proximity to or is allowed to touch the edge of the standard 7, and a light of any suitable character, such as an electric light, is passed behind the piston in such manner as to permit the mechanic to see the light in the space between the surfaces of the piston 17 and the standard 7. In this manner, any discrepancy is quickly detected. This discrepancy is usually the result of a bend or deflection of the connecting rod. The bend in the connecting rod is corrected by straightening the rod.

When the connecting rod has been straightened in the manner described, the piston 17 is removed and the wrist pin 15 is extended as shown in Fig. 3 of the drawings, so that it may be placed in contiguous relation to the trial face 9. It is often found that in straightening the connecting rod, the same is given a torsional twist which causes the wrist pin to assume an incorrect working position. If this happens the wrist pin will be found to have an angular relation to the surface of the trial face 9. This is ascertained by noting the light between the contacting surfaces of the pin and trial face of the jig, and the connecting rod is straightened to bring the axis of the wrist pin parallel to the trial face 9. The rest 19 will not be employed when testing wrist pins, and seldom needed when testing the alinement of the piston with the truing edge 7.

After the rod has been trued in the manner described, the piston may be examined for alinement by re-installing it in operative relation to the connecting rod after the bearings have been perfected. By moving the piston against the vertical edge of the standard 7, then removing the rod 14 and the parts connected therewith from the shaft 11, to reinvert or reverse the same when placed again on the said shaft, the piston may be again moved to the truing edge, when any discrepancy in the relation of the axis of the piston and connecting rod will be detected.

The use of this jig will enable mechanics to do fast and more accurate work in overhauling an automobile engine, and will enable less skilful mechanics to do good and acceptable work.

*Claims.*

1. An apparatus as characterized comprising a member having a straight exposed surface; a supporting shaft; means for rigidly holding said shaft in relation to said member and in perpendicular relation to said surface, and a steady rest for a piston supported on said shaft, said rest having view openings formed therein for permitting the passage of light past said surface.

2. An apparatus as characterized comprising a member having a straight exposed surface; a supporting shaft; means for rigidly holding said shaft in relation to said member and in perpendicular relation to said surface; a steady rest for a piston supported on said shaft; said rest having view openings formed therein for permitting the passage of light past said surface; and means for adjustably securing said rest on said member.

3. An apparatus as characterized comprising a member having a straight exposed surface; a supporting shaft; means for rigidly holding said shaft in relation to said member and in perpendicular relation to said surface; a steady rest for a piston supported on said shaft, said rest having view openings formed therein for permitting the passage of light past said surface; and means for adjustably securing said rest on said member, said rest having a surface disposed in angular relation to the axis of said shaft.

4. An apparatus as characterized comprising a member having a straight exposed surface; a supporting shaft; means for rigidly holding said shaft in relation to said member and in perpendicular relation to said surface; a steady rest for a piston supported on said shaft, said rest having view openings formed therein for permitting the passage of light past said surface; and means for adjustably securing said rest on said member, said rest having a surface disposed in angular relation to the axis of said shaft, said view openings being disposed in service between said plate and said member.

5. A testing jig for testing engine connecting rod bearings, comprising a standard, a horizontal shaft mounted in the standard and adapted to fit the bearing in one end of a connecting rod, said standard having a vertical truing edge to show when the axis of the piston mounted on the wrist pin at the other end of the rod is disposed at a right angle to the crank shaft, said standard having a trial face for engaging the side of the wrist pin and testing whether said side and the shaft axis are in a common plane.

JOHN PEYER.